United States Patent [19]
Green et al.

[11] Patent Number: 5,958,701
[45] Date of Patent: Sep. 28, 1999

[54] METHOD FOR MEASURING INTRAMOLECULAR FORCES BY ATOMIC FORCE

[75] Inventors: John-Bruce De Vault Green, Alexandria, Va.; Alexey Novoradovsky, Rockville, Md.; Gil U. Lee, Alexandria, Va.

[73] Assignee: The United States of America as represented by the Secretary of the Navy, Washington, D.C.

[21] Appl. No.: 09/272,733

[22] Filed: Jan. 27, 1999

[51] Int. Cl.$^6$ .......................................... C12Q 1/68
[52] U.S. Cl. .................... 435/6; 436/63; 73/105; 250/307
[58] Field of Search ................... 435/6; 436/63; 73/104, 105; 250/307

[56] References Cited

U.S. PATENT DOCUMENTS

| | | | |
|---|---|---|---|
| Re. 33,387 | 10/1990 | Binning | 250/306 |
| Re. 34,489 | 12/1993 | Hansma et al. | 250/560 |
| 5,144,833 | 9/1992 | Amer et al. | 73/105 |
| 5,204,581 | 4/1993 | Andreadakis | 313/336 |
| 5,253,516 | 10/1993 | Elings et al. | 73/105 |
| 5,260,824 | 11/1993 | Okada et al. | 359/368 |
| 5,363,697 | 11/1994 | Nakagawa | 73/105 |
| 5,372,930 | 12/1994 | Colton et al. | 435/6 |
| 5,463,897 | 11/1995 | Prater et al. | 73/105 |

FOREIGN PATENT DOCUMENTS

| | | | |
|---|---|---|---|
| 8914071 | 2/1991 | United Kingdom | G01N 27/00 |
| WO 94/23065 | 10/1994 | WIPO | G01N 27/00 |

OTHER PUBLICATIONS

Florin E.–L. et al, "Adhesion Forces Between Individual Ligand–Receptor Pairs" Science 264 (1994) pp. 415–417.

Lee et al, "Sensing Discrete Streptavidin–Biotin Interactions with Atomic Force Microscopy" Langmuir, vol. 10(2), (1994) pp. 354–357.

Dammer et al "Specific Antigen/Antibody Interactions Measured by Force Microscopy" Biophysical Journal vol. 70 (May 1996) pp. 2437–2441.

Chilikoti et al, "The Relationship Between Ligand–Binding Thermodynamics and Protein–Ligand Interaction Forces Measured by Atomic Force Microscopy" Biophysical Journal vol. 69 (Nov. 1995) pp. 2125–2130.

Allen S. et al, "Detection of Antigen–Antibody Binding Events with the Atomic Force Microscope" Biochemistry, vol. 36, No. 24 (1997) pp7457–7463.

Moy V.T. et al, "Adhesive Forces Between Ligand and Receptor Measured by AFM" Colloids and Surfaces A: Physicochemical and Engineering Aspects 93 (1994) pp. 343–348.

Prater, C.B. et al, "Probing Nano–Scale Forces With The AFM" Digital Instruments, Application Notes, at http://www.di.com/AppNotes/ForcCurv/FCMain.html (1995).

"Ultrasharp Silicon Gratings" NT–MDT web site at http://www.ntmdt.ntmdt.ru/grating.htm and http://www.ru/manual/silgrat/htm (1996).

G. Lee et al, "Direct Measurement of the Forces Between Complementary Strands of DNA", Science, 1994, 266, pp. 771–773.

M. Reif et al, "Reversible Unfolding of Individual Titin Immunoglobulin Domains by AMF," Science, 1997, 276, pp. 1109–1112.

*Primary Examiner*—James Ketter
*Attorney, Agent, or Firm*—Thomas E. McDonnell; Ralph T. Webb

[57] ABSTRACT

A method is disclosed for measuring intramolecular forces within a sample compound by providing an atomic force microscope that includes a sample support member and a cantilever. The sample support member has a plurality of protrusions, and each protrusion has an apical substrate region that has been chemically modified to have a sample compound immobilized thereon. The cantilever has a fixed end and a free end, the free end having a surface region that has been chemically modified to have a grasping compound immobilized thereon. To measure intramolecular forces within the sample compound, the relative position and orientation of the cantilever and the sample support member are controlled to select a particular protrusion and to allow a molecule of the grasping compound to bind with a molecule of the sample compound. Then, the relative position and orientation of the cantilever and the sample support member are controlled to vary the distance between the cantilever and the sample support member so that the forces exerted on the cantilever as the distance between the cantilever and the sample support member is varied and as the molecule of the sample compound is stretched between the cantilever and the sample support member can be measured.

30 Claims, 3 Drawing Sheets

METHOD FOR MEASURING INTRAMOLECULAR FORCES BY ATOMIC FORCE

BACKGROUND OF THE INVENTION

1. Field of the Invention

The present invention relates generally to atomic force microscopy (AFM) and to methods for using atomic force microscopy to measure intramolecular forces such as those associated with the secondary structure of RNA, DNA and proteins.

2. Description of the Related Art

In conventional atomic force microscopy, a sample is scanned with a fine-tipped probe mounted on a cantilever, and deflections of the probe tip as it passes across the sample are measured to determine the topography of the sample. Deflections in the probe tip as it passes along the sample surface may be monitored by various methods, including optical reflection, interferometry and piezoelectric strain gauge methods. See, for example, U.S. Pat. No. Re. 33,387 to Binnig, U.S. Pat. No. 5,144,833 to Amer et al, U.S. Pat. No. 5,463,897 to Prater et al, U.S. Pat. No. Re. 34,489 to Hansma et al and U.S. Pat. No. 5,260,824 to Okada et al, all of the above incorporated herein by reference.

In recent years, atomic force microscopy has been used to measure interfacial properties and intermolecular interactions such as elasticity, friction, adhesion, receptor/ligand interactions and antibody/antigen interactions between individual molecules. The use of atomic force microscopy to study intermolecular forces is described, for example, in the following patents, patent applications and publications, incorporated herein by reference: U.S. Pat. No. 5,363,697 to Nakagawa; U.S. Pat. No. 5,372,930 to Colton et al; Florin E. -L. et al, "Adhesion Forces Between Individual Ligand-Receptor Pairs" Science 264 (1994). pp 415–417; Lee, G. U et al, "Sensing Discrete Streptavidin-Biotin Interactions with Atomic Force Microscopy" Langmuir, vol. 10(2), (1994) pp 354–357; Dammer U. et al "Specific Antigen/Antibody Interactions Measured by Force Microscopy" Biophysical Journal Vol. 70 (May 1996) pp 2437–2441; Chilkoti A. et al, "The Relationship Between Ligand-Binding Thermodynamics and Protein-Ligand Interaction Forces Measured by Atomic Force Microscopy" Biophysical Journal Vol. 69 (November 1995) pp 2125–2130; Allen S. et al, "Detection of Antigen-Antibody Binding Events with the Atomic Force Microscope" Biochemistry, Vol. 36, No. 24 (1997) pp7457–7463; and Moy V. T. et al, "Adhesive Forces Between Ligand and Receptor Measured by AFM" Colloids and Surfaces A: Physicochemical and Engineering Aspects 93 (1994) pp 343–348, and U.S. patent application Ser. No. 09/074,541, filed May 8, 1998 for "APPARATUS AND METHOD FOR MEASURING INTERMOLECULAR INTERACTIONS BY ATOMIC FORCE MICROSCOPY" by John-Bruce DeVault Green and Gil U Lee. If interactions between molecules are studied in liquids, the experimental conditions, such as pH, buffer/ionic concentration, buffer/ionic species, etc. may be varied to determine the effect that these have on the forces of interaction.

Atomic force microscopy has great potential for use in measuring intramolecular forces such as those associated with the secondary or tertiary structure of RNA, DNA and proteins. Modern AFM instruments have sufficient sensitivity so that when a molecule such as DNA, RNA or a protein is pulled on, the forces holding together the secondary or tertiary structure of the molecule can be measured. See, for example, G. Lee et al, "Direct Measurement of the Forces Between Complementary Strands of DNA", Science, 1994, 266, pp 771–773, incorporated herein by reference. This article describes an experiment wherein poly-cytosine molecules were attached to the surfaces of a cantilever and a substrate stage of an atomic force microscope. Poly-inosine having an average base length of 160 bases was allowed to hybridize with the poly-cytosine so that the poly-inosine bridged the gap between the cantilever and the substrate. The force versus distance curve plot that was recorded as the surfaces were brought apart and separated showed a long-range cohesive force that can be attributed to the effects of intramolecular forces within the poly-inosine chain. See also M. Reif et al, "Reversible Unfolding of Individual Titin Immunoglobulin Domains by AMF," Science, 1997, 276, pp 1109–1112, incorporated herein by reference. The use of atomic force microscopy to sequence DNA has been described, for example, in Besimon, et al, PCT Application WO94/23065, published on Oct. 13, 1994.

However, the equipment and techniques currently used for atomic force microscopy are not well suited for repetitive measurements of intramolecular forces such as may be required to generate statistically valid data. In particular, chemically modified cantilever probe tips are fragile and easily damaged or inactivated. In a typical chemically modified cantilever probe tip, only the molecules that are bound to the very apex of the tip are available for interacting with a substrate. The crucial area of the probe tip is typically very small and the number of molecules bound thereon is very few; if anything happens to damage those few molecules or to block access to, or to otherwise inactivate that small area of the probe tip, then the probe tip is rendered useless and must be replaced. Replacing the probe tip usually requires replacing the entire cantilever, a procedure that is expensive and time-consuming. Moreover, the typical cantilever probe tip has room for only one type of grasping molecule to be immobilized on the tip, so the cantilever must be replaced or modified whenever it is desired to use a different grasping molecule.

SUMMARY OF THE INVENTION

It has now been discovered that the limitations of atomic force microscopy for use in a method of measuring intramolecular interactions may be overcome by carrying out the method with a modified atomic force microscope apparatus. The sample support is modified so that instead of being a flat surface having molecules of the sample compound or compounds spread out over a relatively large area, it has a plurality of protrusions having molecules of the sample compound or compounds immobilized on the tips or apices of the protrusions. The sample support member of this invention may contain millions of these protrusions per square centimeter. Immobilizing the sample compounds onto the tips of protrusions instead of onto a flat surface places the sample compounds in more accessible position so that it is not necessary to put the grasping compound on the end of a cantilever probe tip in order to access individual molecules of the sample compound. A second change to the atomic force apparatus is to modify the cantilever so that the grasping compound is immobilized directly onto a surface region on the free end of the cantilever instead of on a probe tip.

In the operation of the atomic force microscope to measure intramolecular forces according to the method of present invention, the surface region of the free end of the cantilever is brought into contact with or into proximity with a particular protrusion so that a molecule of the grasping compound binds with a molecule of the sample compound.

Piezoelectric translators currently used in atomic force microscopy are sufficiently precise so that a particular protrusion out of millions on the sample support member can be aligned with a particular portion of the surface region of the cantilever.

The protrusions on the sample support member are analogous to the cantilever probe tip in conventional atomic force microscopy in that they allow a small number of individual molecules to be isolated in a small area in an accessible geometric configuration so that measurements on single molecules may be taken. A major advantage of the method of the present invention is that, whereas in conventional atomic force microscopy, there is only one probe tip, which located on the cantilever, in the present invention, there are numerous analogous structures, the protrusions, which are located on the sample support member. In a conventional atomic force microscope, if the cantilever probe tip is damaged or inactivated, an experiment must be halted until the tip is replaced. In the present invention, if a particular protrusion is damaged or inactivated, one may simply reposition the cantilever over a different protrusion having the same sample compound immobilized thereon and continue with the process of taking measurements. Thousands or millions of protrusions per square centimeter can be created and chemically modified with a sample compound or compounds.

The surface region of the cantilever can have billions or trillions of molecules of the grasping compound immobilized on it, each of which can be used to bind with a sample compound immobilized on a protrusion. If molecules of the grasping compound located on one part of the cantilever become damaged or inactivated in the course of an experiment, the cantilever may be repositioned so that undamaged, active molecules of the grasping compound located on a different portion of the cantilever can be used instead. Moreover, the surface region of the cantilever can be subdivided into spatially addressable subregions each having a different grasping compound immobilized thereon, so that there is no need to replace the cantilever every time it is desired to use a different grasping compound.

By making the changes to the sample support and to the cantilever as described above, it is now possible to use atomic force microscopy for taking repetitive measurements of intramolecular forces so that results may be double-checked with statistical rigor without the researcher having to worry about needing to replace the cantilever in the middle of an experiment because of damage to or inactivation of the grasping compound or the sample compound.

Accordingly, in one aspect, the invention provides a method of measuring intramolecular forces within a sample compound, the method comprising the steps of (a) providing an atomic force microscope that includes a sample support member having a plurality of protrusions, each protrusion having an apical substrate region wherein each apical substrate region has been chemically modified to have a sample compound immobilized thereon, a cantilever having a fixed end and a free end, the free end having a surface region, wherein the surface region has been chemically modified to have a grasping compound immobilized thereon, (b) controlling the relative position and orientation of the cantilever and the sample support member to select a particular protrusion and to allow a molecule of the grasping compound to bind with a molecule of the sample compound, and (c) controlling the relative position and orientation of the cantilever and the sample support member to vary the distance between the cantilever and the sample support member and measuring forces exerted on the cantilever when the distance between the cantilever and the sample support member is varied.

DETAILED DESCRIPTION OF THE PREFERRED EMBODIMENTS

Figure 1:
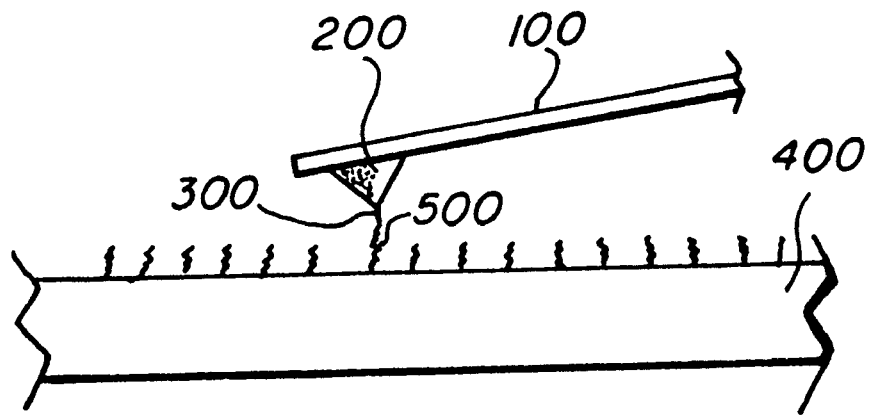
FIG. 1 (Prior art) is a schematic, enlarged representation of an interaction between a conventional cantilever and a conventional substrate.

As shown schematically in FIG. 1 (prior art), intramolecular force measurements using a conventional atomic force microscope are carried out by stretching a sample molecule 500 between a grasping molecule 300 attached to a sharp stylus or tip 200 of a conventional atomic force microscope cantilever 100 and a flat substrate 400.

Figure 2:
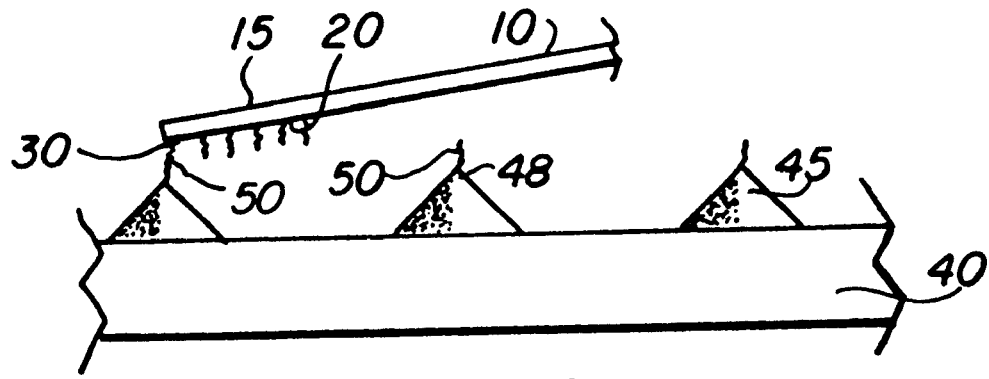
FIG. 2 is a schematic, enlarged representation of an interaction between a cantilever and a sample support member according to the method of the present invention.

As shown schematically in FIG. 2, in the method of the present invention, a cantilever 10 is used that has a free end 15 that has a surface region 20 that is chemically modified to immobilize molecules 30 of a grasping compound thereon. The sample support member 40 used in the present invention includes a plurality of protrusions 45 each having an apical substrate region 48 having sample molecules 50 immobilized thereon. According to the method of present invention, intramolecular forces within a sample molecule may be measured by bringing the cantilever close enough to a particular protrusion so that a molecule of the grasping compound on the cantilever binds with a molecule of the sample compound. Forces exerted on the cantilever are measured as the cantilever is pulled towards or away from the substrate.

The sample compound may be any compound that has a secondary or tertiary structure caused by intramolecular forces that cause the compound to adopt a particular shape or conformation. Compounds having a secondary or tertiary structure include DNA, RNA and proteins. For example, many types of RNA molecules form complex secondary structures that include self-complementary double-stranded regions around non-complementary single strand loops.

The sample compound may also be a double-stranded DNA molecule and, as used herein, the term "intramolecular forces" includes non-covalent bonds between chains of a DNA molecule, including, for example hydrogen bonds between complementary base pairs.

The grasping compound can be any compound that has a binding affinity for the sample compound that is strong enough so that the grasping compound can grasp the sample compound to allow the sample compound to be pulled between the sample support member and the cantilever and weak enough so that the sample compound can be released or pulled away from the grasping compound when the experiment is over without rupturing or destroying the sample compound or the grasping compound. Preferably, the grasping compound has a binding affinity for a specific site at an end of the sample compound opposite to where the sample compound is attached to a protrusion so that as the cantilever is pulled away from the sample support member, the entire length of a molecule of the sample compound is stretched between the cantilever and the sample support member. The grasping compound should be selected so that the force required to pull the grasping compound away from the sample compound is greater than intramolecular forces that contribute to the secondary or tertiary structure of the sample compound. For example, if the sample compound is a polynucleotide such as DNA or RNA, the grasping compound could be a single stranded oligonucleotide that hybridizes with one end of the sample compound. If the sample compound is a protein, the grasping compound could be a compound that has a strong binding affinity for one end of the protein. If necessary, a sample compound can be modified to covalently attach a ligand that has a strong binding partner. The binding partner could then be used as the grasping compound. For example, to measure the intramolecular forces of a protein, the protein could be modified to attach biotin molecules to one end of the protein molecules and then the other end of the protein molecules could be immobilized on the sample support member. Streptavidin, which has a strong binding affinity for biotin, could then be immobilized on the cantilever and used as the grasping compound.

The sample support member includes a support base having a plurality of protrusions that each have a chemically modified apical substrate region. In general, the protrusions should be a size and shape that allows only a small number of molecules of the sample compound to be immobilized at the apex of each protrusion, so that individual molecules of the sample compound can be isolated for study. (Typically, the protrusions are visible only through an optical microscope and cannot be seen clearly by the naked eye.) Preferably, the protrusions are tapered or rounded with an apical radius of curvature between about 5 and about 1000 nm. The apical radius of curvature of a protrusion should be selected according to the coverage (the number of molecules per unit area) of the molecules of the sample compound to be immobilized thereon. For compounds that are in relatively low abundance or coverage, or that are difficult to immobilize, protrusions having relatively large radii of curvature should be used; for example, rounded or hemispherical shapes are preferred for these types of sample compounds. The large radius of curvature helps to increase the odds that every protrusion will have at least one sample molecule immobilized thereon. For molecules that are easy to immobilize with high coverage, tapered protrusions having relatively small radii of curvature should be used. Pyramidal or conical shapes are preferred for these types of sample compounds. The small radius of curvature helps to assure that even though a large number of molecules may become bound to each protrusion during the immobilization process, single molecules at the apices of the protrusions can be isolated for study. A sample support member can be constructed with a variety of protrusions having differing radii of curvature, so that the same support member can be used for immobilizing various types of sample compounds.

In principle, there is no limit to the overall size of the sample support member, although in practice, the size of the sample support member will generally be selected according to the size of the sample holding or stage area of the particular atomic force microscope instrument being used. The size and spacing of the protrusions may be selected to match the size of a particular cantilever so that the apical substrate region of each protrusion is accessible to the cantilever. In particular, the protrusions should be spaced apart at a distance greater than the width of the cantilever so that the cantilever may be maneuvered to address each protrusion without interference from neighboring protrusions. On the other hand, spacing the protrusions too far apart limits the number of protrusions that can be packed into a small area. Preferably, the width of the protrusions at their widest point is about 0.5–5 $\mu$m, and the distance between adjacent protrusions is about 2–50 $\mu$m. Thus, a sample support member that is a few square centimeters in size may have millions of protrusions.

In some atomic force microscopes, a cantilever is held at a fixed angle to the surface of the sample substrate while the cantilever and the substrate are moved relative to each other. If this type of microscope is used with a cantilever and sample support member used in the method of the present invention, then the height of the protrusions can affect how great of a surface area of the cantilever is accessible to the apex of the protrusions. If a protrusion is of insufficient height, the area of the cantilever that can be accessed in the direction away from the free end is limited because the free end would run into the sample support member. Preferably, the height of the protrusions is about 1–10 $\mu$m.

Figure 3:
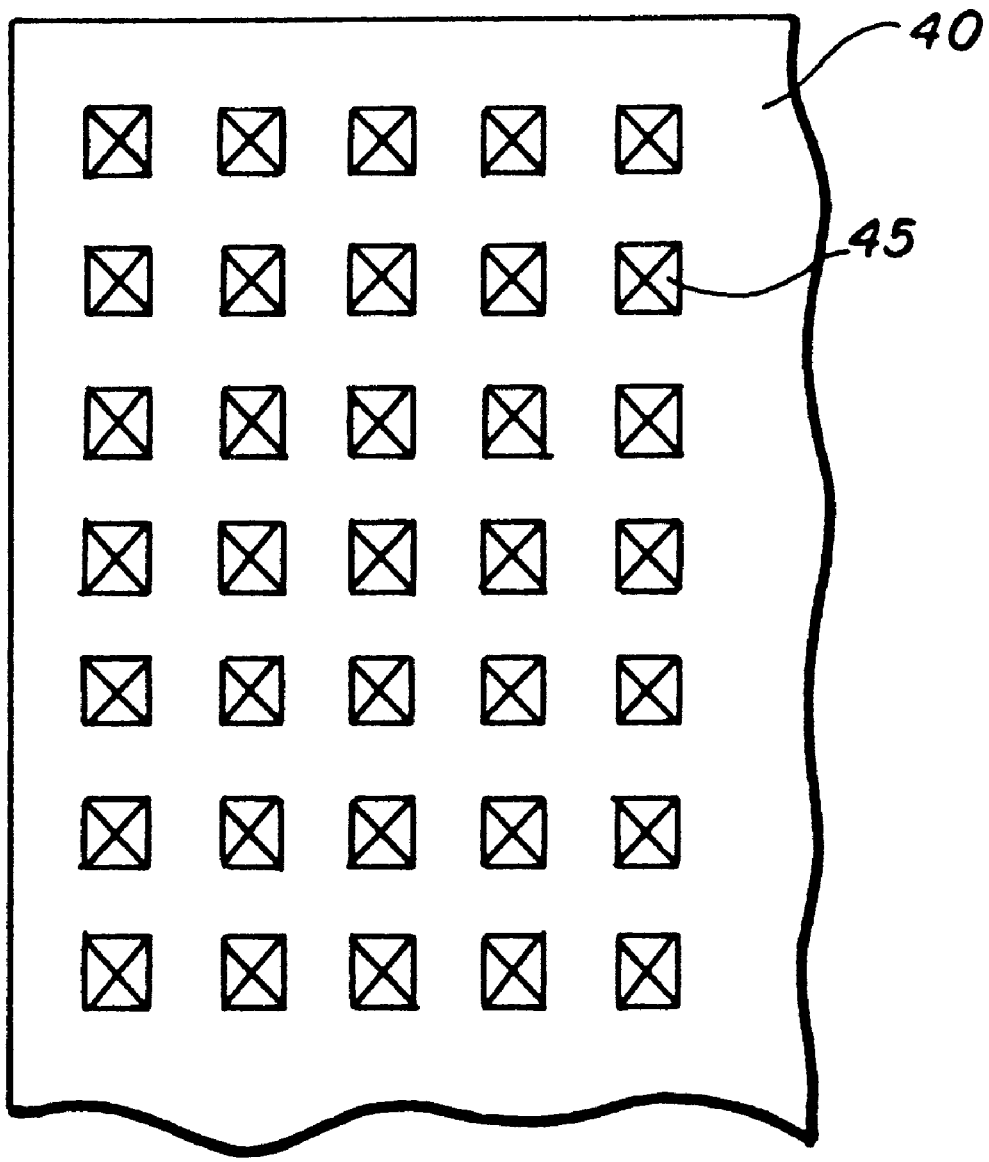
FIG. 3 is a schematic, enlarged representation top view of a portion of a sample support member used in the method of the invention.

As shown schematically in FIG. 3, the sample support member 40 will typically comprise a planar array of protrusions 45. Preferably, the protrusions are arranged in a regular pattern, such as a square array, so that it is easy to keep track of the location of any particular protrusion. For convenience in keeping track of the location of particular protrusions and distinguishing the protrusions from each other, the sample support base may include markings that are visible through an optical microscope. Also, for convenience in distinguishing particular protrusions, groups of protrusions may be separated by empty rows and columns.

Other configurations besides a planar array are possible. For example, the sample support member could be a terraced structure having at least one row of protrusions on each terrace.

The sample support member may be made of any material that can be microfabricated. Preferably, the sample support member is a silicon wafer. The protrusions are preferably integral with the support base and may be made by standard microfabrication techniques such as photopatterning and etching of the sample support member. In particular, methods of microfabrication similar to those used to make conventional cantilever probe tips can be used to make the protrusions of the sample support member. For example, a method of making tapered microminiature silicon structures is described in U.S. Pat. Nos. 5,201,992 and 5,204,581 to Andreadakis, both incorporated herein by reference. The sample support member may also be made by casting in a microfabricated mold.

The apical substrate regions of the protrusions are modified to immobilize sample compounds thereon by any method known in the art for covalently or non-covalently immobilizing a chemical or biochemical entity on a substrate. In particular, chemical methods used to modify conventional cantilever probe tips and sample surfaces can be used to modify the protrusions of the present invention. A general discussion of immobilization chemistry is found in Lee et al, "Chemically-specific Probes for the Atomic Force microscope", Israel Journal of Chemistry, Vol. 36, (1996), pp 81–87, incorporated herein by reference.

The sample support member and/or the cantilever may be coated with one or more layers of material that is useful for binding specific types of sample compounds. For example, the sample support member and/or may be coated with a layer of metal, preferably gold, which allows the immobilization of thiol-containing compounds. For binding onto a metal surface, both proteins and nucleic acids can be modified to incorporate thiol groups into their structure. For example, with proteins, intrinsic amines on the protein surface can be converted into thiols. One method of doing this is by reacting the protein with a 50 to 100 molar excess of 2-iminothiolane (Traut's reagent) for 20–30 minutes. Upon completion, the excess of non-reacted Traut's reagent and the thiol-containing reaction by-products may be removed by multiple extraction (3–5 times) with ethyl acetate. After the protein is immobilized on a gold surface, non-immobilized protein may be removed by prolonged washing of the protein-derivatized surface in a 0.1% to 1% solution of sodium dodecylsulfate (SDS). Streptavidin, for example, may be modified in this manner and immobilized onto a gold-coated cantilever surface to serve as a grasping compound to bind with biotin-modified sample compounds. Nucleic acids may also be modified to incorporate thiol groups. The best way to do this is to first modify the nucleic acid to incorporate amine-containing nucleotide analogs and then convert the amine groups into thiol groups. This method is more cost effective and efficient than direct thiolation of DNA.

Similarly, the sample support member and/or the cantilever may have a silicon surface and the sample compound and/or the grasping compound may be modified to contain silane functional groups that allow the sample compound or the grasping compound to be immobilized onto the silicon surface of the sample support member or the cantilever.

The immobilization of the sample compound may be accomplished by means of a linking compound attached to the apical substrate regions of the protrusions, wherein the linking compound is a compound that is capable of binding a sample compound. Doing so provides flexibility by allowing a researcher to select a particular sample compound or sample compounds to bind to the sample support member at a point in time subsequent to the initial immobilization step. Any linking compound known in the art for binding a sample compound to a substrate may be used. Typical linking compounds are heterobifunctional crosslinkers that have a portion of the molecule that is functionalized to bind a particular type of substrate and a portion of the molecule that is functionalized to bind particular type of sample compound. For example, for binding the linking compound to a silicon substrate, the linking compound may have one or more silane functional groups of the formula —O(CH$_2$)$_n$Si(OR)$_{3-m}$Cl$_m$, wherein R is CH$_3$ or CH$_2$CH$_3$, m is an integer from 0 to 3 and n is an integer from about 9 to about 25. For binding the linking compound to a metal-layered substrate, the linking compound may have one or more thiol functional groups. Likewise, the sample-binding portion of the linking compound may be selected to bind particular types of sample compounds such as proteins or nucleic acids. For example, the linking compound may include one or more maleimide groups that bind thiol-containing residues of polypeptides or the linking compound may include one or more succinimide groups that bind the amine groups of polypeptides or nucleic acids. The linking compound may also be photoactivatable so that the compound is capable of binding a sample compound only after it has been irradiated. Examples of photoactivatable linking compounds that can be immobilized on silicon are described in U.S. Pat. No. 5,773,308 to Conrad, incorporated herein by reference.

Electrochemical and electrostatic methods known in the art may also be used to immobilize sample compounds on the protrusions. For example, the electrostatic potential of the surface of the sample support member may be manipulated to concentrate sample compounds on the apices of the protrusions.

The sample compounds immobilized on the protrusions may be the same or different, depending on the type of research that is being conducted. For example, if a researcher is interested in studying only the intramolecular forces of one specific sample compound, the sample support member can be modified so that only one compound is immobilized on the protrusions. On the other hand, if a researcher is interested in studying the intramolecular forces of a number of different sample compounds, the sample support member could be modified so that different compounds are immobilized on different, spatially addressable protrusions. Preferably, each sample compound would be immobilized on a number of protrusions, so that if one protrusion having a particular sample compound immobilized thereon becomes damaged, another protrusion having the same sample compound can be selected for study. Also, having each sample compound immobilized on a number of different protrusions allows for experiments to be repeated and for results to be double-checked with statistical rigor. Any patterning method known in the art, including, but not limited to, photo-patterning and $\mu$-contact printing, can be used to create arrays of protrusions having a different compounds immobilized thereon. If electrochemical methods are used to attach sample compounds to the protrusions, different sample compounds may be patterned onto the sample support member by using separate electrodes on different sections of the sample support member.

In immobilizing a sample compound or sample compounds on the apical substrate regions of the protrusions, it does not matter if a particular method used has the incidental effect of also immobilizing the sample compound on other portions of the sample support member, as long as access to the sample compound immobilized on the apical substrate region is not blocked.

By providing herein that the sample support member comprises a plurality of protrusions wherein "each protrusion" has an apical substrate region that is modified by the immobilization of a sample compound thereon, it is not meant to exclude from the scope of the invention instances wherein a sample support member also has protrusions that are not chemically modified. For example, a researcher may choose to chemically modify only a portion of a sample support member and to leave the remaining portion of the sample support member untouched. Or a sample compound may be so difficult to immobilize onto a substrate that only a fraction of the protrusions of a sample support member are successfully modified and the remaining protrusions are unmodified. These instances are within the scope of the invention.

The cantilever may be constructed of any material known in the art for use in atomic force microscope cantilevers, including Si, SiO$_2$, Si$_3$N$_4$, Si$_3$N$_4$O$_x$, Al, or piezoelectric materials. The chemical composition of the cantilever is not critical and is preferably a material that can be easily microfabricated and that has the requisite mechanical properties so that it can be used for atomic force microscope measurements. Likewise, the cantilever may be in any size and shape known in the art for atomic force microscope cantilevers, except that, unlike conventional cantilevers, it does not rely on having a stylus or probe tip on its free end. Instead, the cantilever has a surface region at the free end that is chemically modified by the immobilization of at least one grasping compound thereon. Preferably, the cantilever is rectangular (a "diving board" shape) or "V" shaped. The size of the cantilever preferably ranges from about 5 microns to about 1000 microns in length, from about 1 micron to about 100 microns in width and from about 0.04 microns to about 5 microns in thickness. Typical atomic force microscope cantilevers are about 100 microns in length, about 20 microns in width and about 0.3 microns in thickness. In general, increasing the size of the cantilever allows for a larger chemically modified surface region, allowing for a greater number of molecules to be immobilized thereon. However, increasing the size of the cantilever generally decreases the sensitivity of the cantilever to specific intramolecular interactions and reduces the accuracy of force measurements.

The fixed end of the cantilever may be adapted so that the cantilever fits or interfaces with a cantilever-holding portion of a conventional atomic force microscope.

The chemically modified surface region of the cantilever is on the portion of the cantilever that, when the cantilever is incorporated into an atomic force microscope, faces the sample support member. The surface region is preferably a substantially flat area of at least 0.01 square microns near the end of the cantilever.

The cantilever is modified to immobilize the grasping compound thereon by any method known in the art for covalently or non-covalently immobilizing a chemical or biochemical entity on a substrate. The methods described above for immobilizing the sample compounds may also be used for immobilizing the grasping compound. Typically, the surface region will have billions or trillions of molecules of the grasping compound immobilized thereon.

To measure intramolecular forces according to the method of the present invention, the relative position and orientation of the cantilever and the sample support member may be controlled by any known means to select a particular protrusion and to allow a molecule of the grasping compound immobilized on the surface region of the cantilever to bind with a molecule of the sample compound immobilized on the apical substrate area of the selected protrusion. The idea is to simply grab hold of a molecule of the sample compound so that the molecule can be pulled and stretched by moving the cantilever. Either the cantilever or the sample support member or both can be moved or oscillated. If the cantilever has different grasping compounds immobilized on different subregions, the relative position of the cantilever and the sample substrate member may also be controlled so that only a selected subregion of the cantilever interacts with a selected protrusion. Preferably, the means for controlling the relative position and orientation of the cantilever and the sample support member is achieved through the use of piezo-electric actuators, which can convert electrical signal into mechanical displacements with sub-nanometer resolution.

Intramolecular forces of a sample compound are measured by monitoring the forces at the cantilever when the vertical distance between the cantilever and the sample support member is varied. The forces at the cantilever may be measured by any known means including, but not limited to, optical deflection, optical interferometry, and piezoelectric effects. Preferably, forces at the cantilever are measured by measuring deflections of the cantilever from its equilibrium position. Deflections of the cantilever may be measured by a number of techniques, including by reflecting a laser beam off the back of the cantilever onto a position sensitive detector.

Measurements may be carried out in any medium or environmental conditions used in atomic force microscopy including, but not limited to, under ambient conditions or under a liquid medium. In a liquid medium, experimental conditions such as pH, ionic concentration and the presence of inhibitors or competitors can be controlled and varied.

Commercially available atomic force microscope instruments may be used for controlling the relative position of the cantilever and the sample support member and for measuring forces on the cantilever. Typically, commercial atomic force microscopes have removable cantilevers and sample supports, so these instruments may be modified by simply substituting the cantilevers and sample support members of the present invention. The process of carrying out measurements may be automated and computerized, so that a large number of sample compounds, such as in a combinatorial library, can be analyzed rapidly, efficiently and with statistical rigor. The cantilever and sample support member of the present invention may also be used with an atomic force microscope of a type that has multiple, independently controlled cantilevers, such as is described, for example, in U.S. Pat. No. 5,047,633 to Finlan et al, incorporated herein by reference.

In an alternative method of the present invention, the location of the sample compound and the grasping compound may be reversed; that is, the sample compound may be immobilized onto the cantilever and the grasping compound may be immobilized onto the sample support member, (which would then be called the "grasping compound support member"). In other respects, the steps in carrying out intramolecular force measurements would be substantially the same. In this alternative, a plurality of cantilevers could be used to hold multiple copies of a sample compound or to hold different sample compounds.

The method of the present invention may be used to pull apart a DNA helix to gather information relating to the sequence of the DNA. The DNA to be studied should be modified so that one strand of the double helix can be immobilized onto the sample support member and the other strand can bind to a grasping compound that is immobilized on the cantilever. Binding sites or functional groups for the immobilization of the DNA on the sample support member and for binding with the grasping compound on the cantilever should both be on opposite strands of the same terminus of the DNA, that is, one binding site or functional group should be on the 3' end of one strand and one binding site or functional group should be on the 5'end of the other strand. The opposite terminus of the DNA molecule should be free of binding sites. This allows both the sample support member and the grasping compound to grab hold of the same end of the DNA (on opposing strands). The DNA molecule may then be pulled apart one base pair at a time and binding forces as the two strands are separated may be measured. Preferably, the opposite or distal terminus of the DNA molecule is covalently cross-linked so that the two strands do not come apart completely. This allows the double helix structure to be restored and the measurements to be repeated. For convenience, the terminus that is attached to the sample support member and the grasping compound may be referred to as the proximal terminus and the free terminus that is crosslinked may be referred to as the distal terminus.

Binding groups on the 5' end of a DNA molecule may be introduced by incorporating the binding group into a PCR primer. Binding groups on the 3' end may be added by enzymatic or photochemical methods. A preferred method of incorporating a binding group on the 3' end is to include a restriction endonuclease site on the PCR primer that allows the DNA to be cleaved to form a sticky end with a 5' overhang. The 3' end may then be filled in by DNA polymerase to incorporate a modified nucleotide having a binding group.

Crosslinking of the distal terminus of the DNA molecule may be accomplished any means known in the art, including by covalent crosslinking. Preferably, the crosslinking is accomplished by incorporating a psoralen functional group into the 5' end of the distal terminus. This may be done by incorporating psoralen into a PCR primer. Photocrosslinking of the free DNA terminus is performed by irradiation of the PCR product with UV light with 310–350 mn wavelength during 10–20 min. To achieve higher efficiency of crosslinking (up to 90%), the base next to 5'-psoralen in the PCR primer sequence must be adenine. Additionally, the DNA polymerase used for PCR must lack 3'–5' exonuclease activity (non-proofreading) to incorporate an extra adenine residue at the 3'-end of the distal DNA terminus. The combination of the above conditions creates the following configuration at the free DNA terminus:

5'- . . . TA-3'

3'- . . . APs-5', where Ps is psoralen.

This configuration is optimal for efficient terminal DNA strand crosslinking.

When using the method of the present invention to gather sequence information on a strand of DNA, another consideration is that the backbone of the double-stranded DNA (dsDNA) must remain in solution without significant adhesion (except at the attachment points) to the surfaces of the sample support member. This may particularly be a problem with a gold-covered sample support member since long dsDNA fragments are strongly attracted to a gold surface. De-attachment of an adhered DNA backbone may be achieved via incubation of the sample support member with the immobilized DNA in a buffer containing a divalent cation, preferably magnesium ions, which neutralize the negative charge of the DNA sugar-phosphate backbone and stabilize the DNA helix. The divalent cation should be present in an effective amount to prevent the DNA from adhering to the sample support member surface. Preferably, the buffer contains 0.5–1.0 M magnesium chloride and 0.1%–1% Tween-20® detergent at pH 8.0. The incubation is followed by passivating of the surface areas free from DNA-binding by self-assembly of thio-alcohol monolayers.

Having described the invention, the following examples are given to illustrate specific applications of the invention, including the best mode now known to perform the invention. These specific examples are not intended to limit the scope of the invention described in this application.

EXAMPLE

Measurements of Intramolecular Forces within a DNA Molecule

A 511-bp PCR fragment was amplified from human genomic DNA using a 5'-biotinylated "proximal" primer and 5'-amino-modified "distal" primer. The fragment was purified by double ethanol precipitation and then the distal amine was converted to a thiol using 2-iminothiolane (Traut's reagent, Pierce). This reaction was performed for 30 minutes in a 50 mM triethanolamine buffer at pH 8.0 with 65 mM Traut's reagent at room temperature. The DNA concentration in the reaction mixture was 0.1 to 1 $\mu$M. The reaction was quenched by addition of EDTA to 2.0 mM final concentration. The excess of Traut's reagents and free thiols was eliminated by ultrafiltration with Microcon 100 microconcentrators (Millipore) or by multiple ethyl acetate extraction. By a similar procedure, streptavidin was modified to add thiol groups. The streptavidin concentration in the reaction mixture was 6 $\mu$M.

Figure 4:
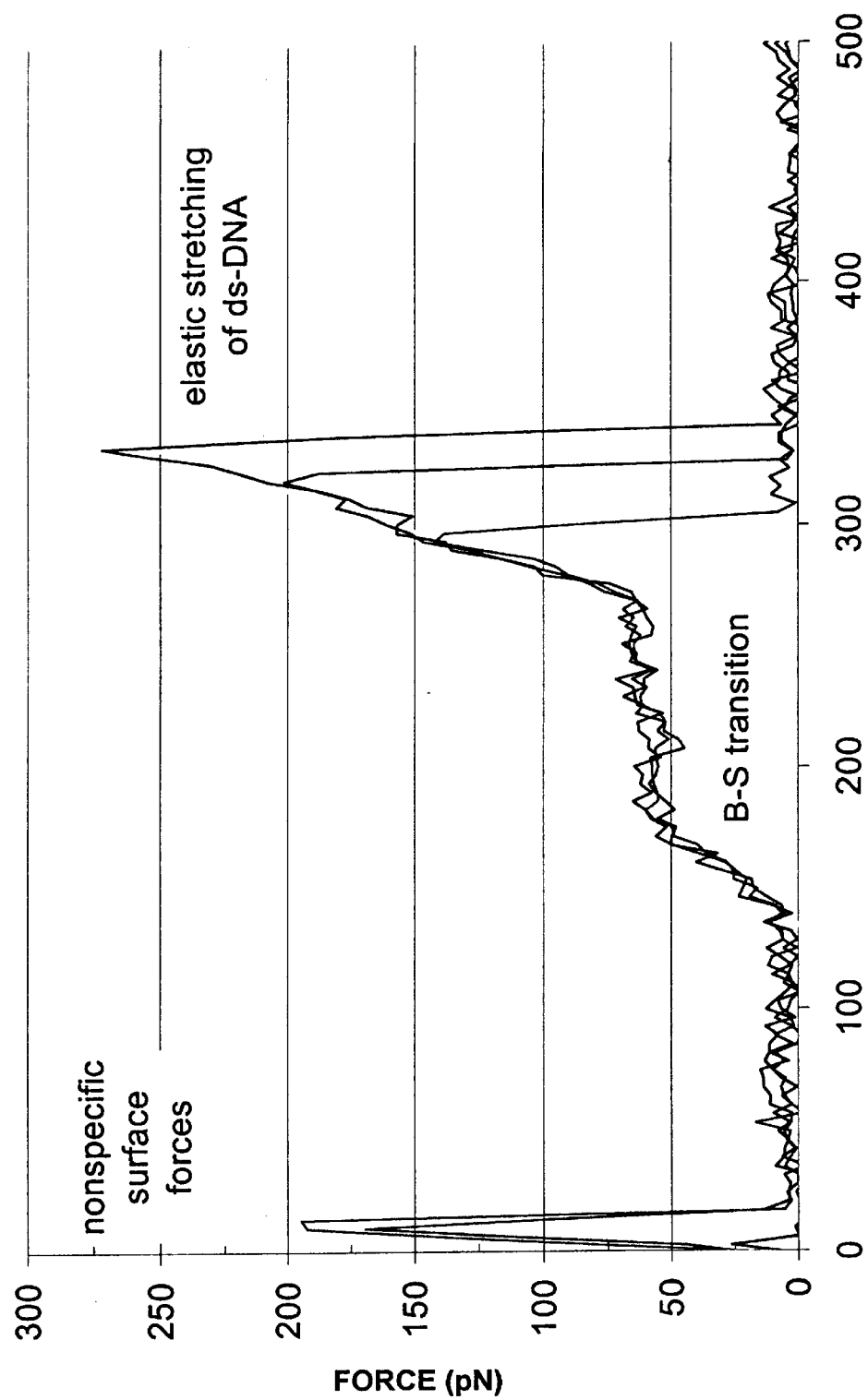
FIG. 4 is a graph of three superimposed plots showing the force exerted on a cantilever as a function of the distance between the cantilever and the sample support member as a 511-base-pair (bp) fragment of DNA is stretched between the cantilever and the sample support member.

The thiolated DNA fragment and the thiolated streptavidin were incubated, respectively, with a gold-coated substrate support member and a tipless gold-coated cantilever, each incubation taking place in a 10 mM HEPES 5 mM EDTA buffer at pH 6.6 for at least 1 hour. The sample support member and the cantilever were then washed with 0.5–1.0% SDS in 2× Standard Saline Citrate (SSC) buffer at pH 7.0 for 1 hour and non-coated gold surfaces were passivated by one-hour exposure to 0.15 mM mercaptohexanol in 2× SSC buffer at pH 7.0. The sample support member and the cantilever were then washed vigorously and then used for AFM experiments to measure intramolecular forces within the DNA molecule. Pulling and stretching of the DNA molecules was performed in 2× SSC buffer by repeatedly bringing the modified cantilever into proximity with DNA molecules on an apical substrate region of the sample support member to establish a contact between a streptavidin molecule on the cantilever and a "distal" biotin on a apical DNA molecule. FIG. 4 shows the force exerted on the cantilever as a function of distance between the sample support member and the cantilever. As the measurements were being made, the tip of the apical substrate region and cantilever were connected by a DNA-streptavidin bridge which included only those two molecules. As the tip and cantilever were separated, the molecules straightened, and when the distance reached about 125 nm, the force required to stretch the molecular bridge actually transformed the DNA molecule from one form (B-form) to another form (S-form), a transition that requires a force of about 60 pN, and which occurs until the entire length of DNA is transformed. Once transformed, the DNA bridge becomes taut at a distance of about 275 nm. Further movement of the cantilever and sample support member results in elastic stretching, which is finally released when the streptavidin-biotin interaction ruptures (usually at a force of about 200 pN). FIG. 4 show the overlapping plots of three repetitions.

Obviously, many modifications and variations of the present invention are possible in light of the above teachings. It is therefore to be understood that, within the scope of the appended claims, the invention may be practiced otherwise than as specifically described.

What is claimed is:

1. A method of measuring intramolecular forces within a sample compound, the method comprising the steps of (a) providing an atomic force microscope that includes a sample support member having a plurality of protrusions, each protrusion having an apical substrate region wherein each apical substrate region has been chemically modified to have a sample compound immobilized thereon, a cantilever having a fixed end and a free end, the free end having a surface region, wherein the surface region has been chemically modified to have a grasping compound immobilized thereon, (b) controlling the relative position and orientation of the cantilever and the sample support member to select a particular protrusion and to allow a molecule of the grasping compound to bind with a molecule of the sample compound, and (c) controlling the relative position and orientation of the cantilever and the sample support member to vary the distance between the cantilever and the sample support member and measuring forces exerted on the cantilever when the distance between the cantilever and the sample support member is varied.

2. The method of claim 1 wherein surface region of the cantilever is a metal surface and wherein the grasping compound is immobilized onto the metal surface by means of a thiol functional group attached to the grasping compound.

3. The method of claim 2 wherein the metal surface is a gold surface.

4. The method of claim 1 wherein each apical substrate region of the sample support member comprises a metal surface and wherein the sample compound is immobilized onto the metal surface by means of a thiol functional group attached to the sample compound.

5. The method of claim 4 wherein the metal surface is a gold surface.

6. The method of claim 1 including the further steps of controlling the relative position and orientation of the cantilever and the sample support member to apply sufficient force to separate the molecule of the sample compound and a molecule of the grasping compound and then repeating steps (b) and (c) so that a different molecule of the sample compound on the sample support member binds with a different molecule of the grasping compound on the cantilever.

7. The method of claim 1 wherein the grasping molecule and the sample molecule are single-stranded nucleic acids and wherein the grasping molecule hybridizes with an end portion of the sample molecule.

8. The method of claim 1 wherein
the sample compound has a proximal end and a distal end, the proximal end including at least one functional group that immobilizes the sample compound onto the apical substrate region and the distal end including at least one biotin moiety and wherein
the grasping compound is a streptavidin compound modified with at least one functional group that immobilizes the streptavidin compound onto the surface region of the free end of the cantilever.

9. A method of measuring intramolecular forces within a sample compound, the method comprising the steps of
(a) providing an atomic force microscope that includes
a sample support member having a plurality of tapered or rounded protrusions, each protrusion having a gold-coated apical substrate region and
a cantilever having a fixed end and a free end, the free end having a gold-coated surface region,
(b) providing a sample compound having at least one thiol functional group attached thereto,
(c) providing a grasping compound having at least one thiol functional group attached thereto,
(d) incubating the sample compound with the sample support member so that the thiol functional group adheres to the gold-coated apical substrate region, thereby immobilizing molecules of the sample compound on the apical substrate region of each protrusion of the sample support member,
(e) incubating the grasping compound with the cantilever so that the thiol functional group of the grasping compound adheres to the gold-plated surface region of the cantilever, thereby immobilizing molecules of the grasping compound on the surface region of the free end of the cantilever,
(f) controlling the relative position and orientation of the cantilever and the sample support member to select a particular protrusion and to allow a molecule of the grasping compound to bind with a molecule of the sample compound, and
(g) controlling the relative position and orientation of the cantilever and the sample support member to vary the distance between the cantilever and the sample support member and measuring forces exerted on the cantilever when the distance between the cantilever and the sample support member is varied.

10. A method of measuring intramolecular forces within a sample compound, the method comprising the steps of
(a) providing an atomic force microscope that includes
a sample support member having a plurality of tapered or rounded protrusions, each protrusion having a apical substrate region having a silicon surface and
a cantilever having a fixed end and a free end, the free end having a silicon surface region,
(b) providing a sample compound having at least one silane functional group attached thereto,
(c) providing a grasping compound having at least one silane functional group attached thereto,
(d) incubating the sample compound with the sample support member so that the silane functional group adheres to the silicon surface of the apical substrate region, thereby immobilizing molecules of the sample compound on the apical substrate region of each protrusion of the sample support member,
(e) incubating the grasping compound with the cantilever so that the silane functional group of the grasping compound adheres to the silicon surface region of the cantilever, thereby immobilizing molecules of the grasping compound on the surface region of the free end of the cantilever,
(f) controlling the relative position and orientation of the cantilever and the sample support member to select a particular protrusion and to allow a molecule of the grasping compound to bind with a molecule of the sample compound, and
(g) controlling the relative position and orientation of the cantilever and the sample support member to vary the distance between the cantilever and the sample support member and measuring forces exerted on the cantilever when the distance between the cantilever and the sample support member is varied.

11. A method of measuring intramolecular forces within a sample compound, the method comprising the steps of
(a) providing an atomic force microscope that includes
a sample support member having a plurality of tapered or rounded protrusions, each protrusion having a gold-coated apical substrate region and
a cantilever having a fixed end and a free end, the free end having a gold-coated surface region,
(b) providing a sample compound having first and second regions wherein at least one thiol functional group is attached to the first region and at least one biotin moiety is attached to the second region,
(c) providing a modified streptavidin compound having at least one thiol functional group attached thereto,
(d) incubating the sample compound with the sample support member so that the thiol functional group adheres to the gold-coated apical substrate region, thereby immobilizing molecules of the sample compound on the apical substrate region of each protrusion of the sample support member, (e) incubating the modified streptavidin compound with the cantilever so that the thiol functional group of the modified streptavidin compound adheres to the gold-plated surface region of the cantilever, thereby immobilizing molecules of the modified streptavidin compound on the surface region of the free end of the cantilever, (f) controlling the relative position and orientation of the cantilever and the sample support member to select a particular protrusion and to allow a molecule of the modified streptavidin compound and a biotin moiety of a molecule of the sample compound to bind to form a biotin/streptavidin complex, and (g) controlling the relative position and orientation of the cantilever and the sample support member to vary the distance between the cantilever and the sample support member and measuring forces exerted on the cantilever when the distance between the cantilever and the substrate is varied.

12. The method of claim 11 including step (h) of controlling the relative position and orientation of the cantilever and the sample support member to apply sufficient force to the molecule of the modified streptavidin compound and the molecule of the sample compound to rupture the biotin/streptavidin complex and wherein steps (f), (g), and (h) are repeated so that the biotin moiety on a different molecule of the sample compound on the sample support member binds with a different molecule of the modified strepavidin compound on the cantilever.

13. A method of measuring intramolecular forces within a double-stranded DNA molecule, the method comprising the steps of (a) providing an atomic force microscope that includes
a sample support member having a plurality of tapered or rounded protrusions, each protrusion having an apical substrate region and
a cantilever having a fixed end and a free end, the free end having a surface region, wherein the surface region has been chemically modified to have a grasping compound immobilized thereon, (b) providing a double-stranded DNA compound having a proximal terminus and a distal terminus, wherein the proximal terminus is modified so that a first strand of the double-stranded DNA contains a first functional group that is capable of adhering to the apical substrate region of the sample support region and so that a second strand of the double-stranded DNA contains a second function group that binds with the grasping compound, (c) incubating the DNA compound with the sample support member so that the first functional group adheres to the apical substrate region of a protrusion of the sample support member, thereby immobilizing the first strand of the double-stranded DNA on the apical substrate region, (d) controlling the relative position and orientation of the cantilever and the sample support member so that the grasping compound binds with the second functional group on the second strand of the double stranded DNA, and (e) controlling the relative position and orientation of the cantilever and the sample support member to vary the distance between the cantilever and the sample support member to cause the two strands of the double-stranded DNA to separate and measuring forces exerted on the cantilever when the distance between the cantilever and the substrate is varied.

14. The method of claim 13 wherein the double stranded DNA compound has a distal terminus that is cross-linked.

15. The method of claim 14 wherein the distal terminus is covalently cross-linked by means of a psoralin-containing functional group.

16. The method of claim 13 wherein after step (c) of incubating the DNA compound with the sample support member, the sample support member is incubated in a buffer that prevents the DNA compound from adhering to the sample support member except through the adhesion of the first functional group to the apical substrate region.

17. The method of claim 16 wherein the buffer contains divalent cations.

18. The method of claim 17 wherein the divalent cations comprise magnesium ions.

19. The method of claim 13 wherein the grasping compound is streptavidin and the second functional group is biotin.

20. The method of claim 13 wherein the apical substrate region has a gold surface and the first functional group is a thiol group.

21. The method of claim 13 wherein the apical substrate region has a silicon surface and the first functional group is a silane group.

22. A method of measuring intramolecular forces within a sample compound, the method comprising the steps of (a) providing an atomic force microscope that includes
a grasping compound support member having a plurality of protrusions, each protrusion having an apical substrate region wherein each apical substrate region has been chemically modified to have a grasping compound immobilized thereon, and
a cantilever having a fixed end and a free end, the free end having a surface region, wherein the surface region has been chemically modified to have a sample compound immobilized thereon and wherein the sample compound is a compound having a secondary structure,
wherein the grasping compound and the sample compound are selected to have a binding affinity such that the force required to rupture the binding between the grasping compound and the sample compound is greater than the force required to rupture intramolecular bonds that contribute to the secondary structure of the sample compound, (b) controlling the relative position and orientation of the cantilever and the grasping compound support member to select a particular protrusion and to allow a molecule of the grasping compound to bind with a molecule of the sample compound, and (c) controlling the relative position and orientation of the cantilever and the grasping compound support member to vary the distance between the cantilever and the grasping compound support member and measuring forces exerted on the cantilever when the distance between the cantilever and the grasping compound support member is varied.

23. The method of claim 22 wherein surface region of the cantilever is a metal surface and wherein the sample compound is immobilized onto the metal surface by means of a thiol functional group attached to the sample compound.

24. The method of claim 23 wherein the metal surface is a gold surface.

25. The method of claim 22 wherein each apical substrate region of the grasping support member comprises a metal surface and wherein the grasping compound is immobilized onto the metal surface by means of a thiol functional group attached to the grasping compound.

26. The method of claim 25 wherein the metal surface is a gold surface.

27. The method of claim 22 including the further steps of controlling the relative position and orientation of the cantilever and the grasping support member to apply sufficient force to separate the molecule of the sample compound and a molecule of the grasping compound and then repeating steps (b) and (c) so that a different molecule of the sample compound on the cantilever binds with a different molecule of the grasping compound on the grasping support member.

28. The method of claim 22 wherein the grasping molecule and the sample molecule are single-stranded nucleic acids and wherein the grasping molecule hybridizes with an end portion of the sample molecule.

29. The method of claim 22 wherein the sample compound has a proximal end and a distal end, the proximal end including at least one functional group that immobilizes the sample compound onto the cantilever and the distal end including at least one biotin moiety and wherein the grasping compound is a streptavidin compound modified with at least one functional group that immobilizes the streptavidin compound onto the apical substrate regions of the grasping support member.

30. The method of claim 22 wherein the atomic force microscope includes a plurality of cantilevers, each having a sample compound immobilized thereon and wherein the steps (b) and (c) are carried out with respect to each cantilever and with respect to a different protrusion.

* * * * *